G. A. ROSSITER.
GYROSCOPIC COMPASS.
APPLICATION FILED FEB. 9, 1920.
1,378,620.
Patented May 17, 1921.
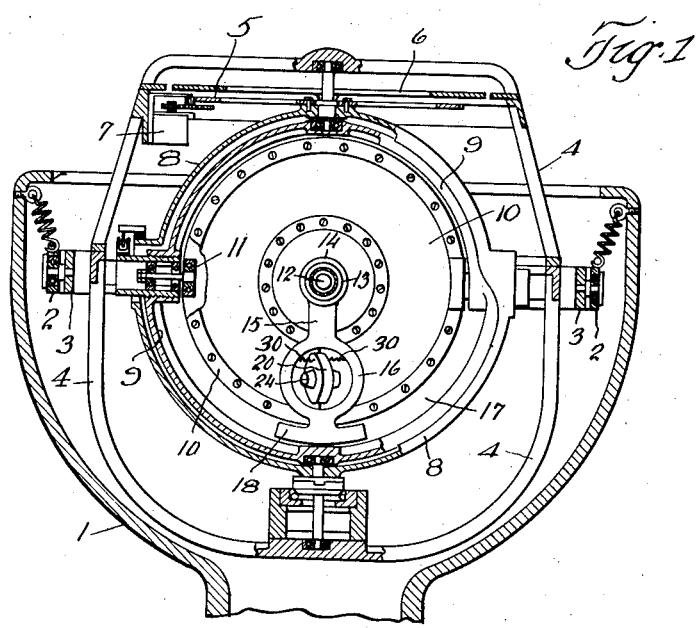
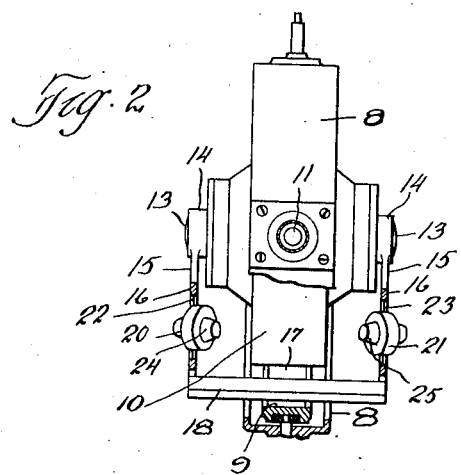
Inventor
G. A. Rossiter, by
T. W. Witherspoon
Attorney

UNITED STATES PATENT OFFICE.

GEORGE A. ROSSITER, OF BROOKLYN, NEW YORK, ASSIGNOR TO THE CARRIE GYROSCOPIC CORPORATION, OF NEW YORK, N. Y., A CORPORATION OF NEW YORK.

GYROSCOPIC COMPASS.

1,378,620.  Specification of Letters Patent.  Patented May 17, 1921.

Application filed February 9, 1920. Serial No. 357,155.

*To all whom it may concern:*

Be it known that I, GEORGE A. ROSSITER, a citizen of the United States, residing at Brooklyn, in the county of Kings and State of New York, have invented certain new and useful Improvements in Gyroscopic Compasses; and I do hereby declare the following to be a full, clear, and exact description of the invention, such as will enable others skilled in the art to which it appertains to make and use the same.

This invention relates to gyroscopic compasses and has for its object to improve the relations of parts that have been heretofore provided.

With this and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is a diagrammatic sectional view looking in a direction parallel to the rotative axis of a gyro compass with my invention applied thereto; and Fig. 2 is a view, partially in section, of a portion of the parts shown in Fig. 1, looking in a direction perpendicular to the rotative axis.

1 indicates the binnacle, 2 the outer Cardan ring, 3 the inner Cardan ring, 4 a supporting frame located inside the ring 3, 5 the compass card, 6 the follow up gear wheel, 7 the follow up motor, 8 the follow up or shadow ring, 9 the vertical ring, 10 the wheel casing, 11 the pivots therefor, and 12 the horizontal rotative axle of the gyroscopic wheel not shown. All the foregoing parts, are or may be, of the same construction and operation as are the corresponding members disclosed in my prior Patent #1311716, for gyroscopic compass, dated July 29, 1919, and also disclosed in my co-pending application, Serial Number 275805, filed February 8, 1919, for gyroscopic compasses.

It is well known that if a gyro compass is to automatically seek the true north its directive element must be pendulous, or have one of its degrees of freedom partially suppressed. This is sometimes accomplished by mounting the gyro wheel with three degrees of freedom, and then applying a weight to the horizontal axis passing through the horizontal trunnions. But in such cases, it is evident when one or the other of said trunnions is raised the center of gravity of said weight will also be raised and moved out of the vertical plane of the rotative or wheel axis, with the result that compass errors will arise, all as explained in my said application above mentioned. In said application these errors were corrected by making the weight in the form of a mercury tube, so that the center of gravity of the mercury would not move out of said vertical plane. It is equally well known that when a gyro compass with two degrees of freedom is subject to the disturbing actions of heavy seas, a number of other complex forces are generated which disturb the correct indications of the card or north pointing axis, and the stabilizing gyros lettered 100 and 101 in my said patent above noted are provided to prevent the generation of said forces in the first instance and to thus preserve a steady support for the wheel closely simulating, in heavy seas, the conditions found on land.

The construction of this invention provides a pendulous mass to suppress one of the degrees of freedom of the wheel, and said mass is provided with stabilizing gyros so that its center of gravity cannot be displaced from the vertical plane and thus cause the above mentioned errors all as will now appear.

That is to say, 13 represents a ball bearing surrounding each end of the axis 12, and 14 represents rings or straps supported by said ball bearing. Depending from said rings 14 are the side members 15, each provided with the loop members 16, and joining said loop members in the space 17 between the casing 10 and vertical ring 9, is the bar or weight 18, so that the whole constitutes a pendulum hung from the rotative axis as a center, all as will be clear from the drawings.

In the loops 16 there are pivoted the small gyros 20 and 21 respectively on the vertically disposed axes 22 and 23, and said gyros 20 and 21 are so disposed in their bearings that their respective rotative axes 24 and 25 are opposed to each other, and lie in vertical planes making opposing angles of say 45° to the vertical planes of the axes 11 and 12. In order to maintain said gyros 20 and 21, in their predetermined positions, each is provided with a pair of springs 30, (see Fig. 1), so should any temporary disturbing force tend to move the gyro wheel out of its predetermined plane, one or the other of said springs will be subjected to tension and will restore said wheel to its normal position when said force ceases to act.

The operation of this improved stabilized weighting means is as follows:—The weight of the two small gyros 20 and 21 constitute a considerable portion of the total weight controlling the main gyro wheel of the compass; and said small gyros in addition are possessed of directive forces themselves, which tend under the relative action of the earth to cause their own rotative axes 24 and 25 to point north and south. Accordingly, their axes will tend to become displaced and will tend to orient in the same manner as does the main wheel. But as said axes 24 and 25 oppose each other, when they have oriented to the same number of degrees from the plane of the meridian, their forces exerted on their bearings and on the main axis will exactly neutralize each other. That this is true will be evident if we suppose the main axis 12 to be in the plane of the meridian and that one axis 24 is pointing east of the meridian while the other 25 is pointing west of the meridian. In fact, said gyros 20 and 21 constitute in themselves a sort of self corrective compass, while they also form a material part of a stabilized pendulum controlling the main directive wheel.

In other words, these said gyros 20 and 21 may be said to act in a manner similar to the stabilizing gyros 100 and 101 in my said Patent #1311716, and also in a manner similar to the pendulous mass, in my said application.

In addition to these said gyros 20 and 21, it is desirable to use a means of dampening the orientations of the main wheel. Such a dampening means is not illustrated in this case, but a suitable form of such means is found in my said application above mentioned.

The stabilizing gyros 100 and 101 of my said former patent may also be employed with this compass. It will thus be clear that my pendulous weight acts to suppress one of the degrees of freedom of the directive axis 12 of the main gyro wheel, while the smaller gyros 20 and 21, stabilize the said pendulous weight in heavy seas, and act to prevent its center of gravity from leaving the vertical plane of said axis 12.

Stated in still other language, as will be clear from my said application above, the disturbing forces due to the rolling and pitching movements of a vessel will act upon a pendulous weight, not provided with gyro stabilizers, in such a manner as to cause it to begin to oscillate and to tend to aline itself according to its moments of inertia which produce errors in the compass as a whole. But, when such a weight is provided with stabilizing gyros, in the manner above disclosed, its center of gravity remains substantially in the vertical plane including the directive axis 12 of the main gyro wheel, and the gravity couples causing the above mentioned errors are not permitted to be created.

It is obvious that those skilled in the art may vary the details of construction as well as the arrangement of parts without departing from the spirit of the invention, and therefore, I do not wish to be limited to the above disclosure except as may be required by the claims.

What I claim is:

1. In a gyro compass provided with a directive axis; a pendulum pivoted from said axis as a center; and a gyroscopic device carried by and forming a part of the weight of said pendulum, substantially as described.

2. In a gyro compass provided with a directive axis; a pendulum pivoted from said axis as a center; and a plurality of gyroscopic devices carried by and forming a part of the weight of said pendulum, substantially as described.

3. In a gyro compass provided with a directive axis; a pendulum pivoted from said axis as a center; and a pair of gyroscopic devices having axes pointing in different directions carried by and forming a part of the weight of said pendulum, substantially as described.

4. In a gyro compass the combination of a directive axis; a pendulum associated with said axis; and a pair of gyroscopic devices associated with said pendulum and adapted to orientate in opposite directions, substantially as described.

5. In a gyro compass the combination of a directive axis; a pendulum associated with said axis; a pair of gyroscopic devices pivotally associated with said pendulum and adapted to orientate in opposite directions; and springs associated with said gyroscopic devices adapted to yieldingly maintain the latter in their normal positions, substantially as described.

6. In a gyro compass provided with a directive axis the combination of a pendulous weight acting to suppress one of the degrees of freedom of said axis; and gyroscopic means carried by said weight for stabilizing the center of gravity of said weight in the vertical plane of said axis, substantially as described.

7. In a gyro compass the combination of a directive element having a rotative axis and mounted for movement about a horizontal axis at a substantial angle to said rotative axis; pendulous means mounted for movement relative to said element only about said rotative axis and adapted to partially suppress movement of said element about said horizontal axis to produce orientation thereof; and a gyroscopic stabilizing means carried by said pendulous means and mounted with its rotative axis at an acute angle to the rotative axis of said directive element, substantially as described.

8. In a gyro compass the combination of a directive element having a rotative axis and mounted for movement about a horizontal axis at a substantial angle to said rotative axis; pendulous means mounted for movement relative to said element only about said rotative axis; and adapted to partially suppress movement of said element about said horizontal axis to produce orientation thereof; and a plurality of gyroscopic stabilizing means carried by said pendulous means and mounted with their rotative axes forming a substantial angle to each other and to the rotative axis of said directive element, substantially as described.

In testimony whereof I affix my signature.

GEORGE A. ROSSITER.